(12) United States Patent
Anon

(10) Patent No.: US 8,773,441 B2
(45) Date of Patent: Jul. 8, 2014

(54) SYSTEM AND METHOD FOR CONFORMING AN ANIMATED CAMERA TO AN EDITORIAL CUT

(75) Inventor: Josh Anon, Moraga, CA (US)

(73) Assignee: Pixar, Emeryville, CA (US)

( * ) Notice: Subject to any disclaimer, the term of this patent is extended or adjusted under 35 U.S.C. 154(b) by 474 days.

(21) Appl. No.: 12/830,254

(22) Filed: Jul. 2, 2010

(65) Prior Publication Data

US 2011/0007080 A1 Jan. 13, 2011

Related U.S. Application Data

(60) Provisional application No. 61/224,749, filed on Jul. 10, 2009.

(51) Int. Cl.
*G06T 13/20* (2011.01)

(52) U.S. Cl.
USPC ............................ 345/473; 345/419; 345/474

(58) Field of Classification Search
None
See application file for complete search history.

(56) References Cited

U.S. PATENT DOCUMENTS

| | | | |
|---|---|---|---|
| 6,154,723 A * | 11/2000 | Cox et al. | 704/270 |
| 7,317,457 B2 * | 1/2008 | Felt | 345/473 |
| 8,253,728 B1 * | 8/2012 | Sullivan et al. | 345/419 |
| 2003/0146915 A1 * | 8/2003 | Brook et al. | 345/473 |
| 2006/0022983 A1 * | 2/2006 | Gauthier et al. | 345/473 |
| 2009/0116732 A1 * | 5/2009 | Zhou et al. | 382/154 |
| 2011/0102424 A1 * | 5/2011 | Hibbert et al. | 345/419 |

OTHER PUBLICATIONS

Huang et al., Reusing Motions and Models in Animations, Multimedia 2001, pp. 21-32, Springer Vienna (2002).*

* cited by examiner

*Primary Examiner* — Xiao Wu
*Assistant Examiner* — Greg Raburn
(74) *Attorney, Agent, or Firm* — Patterson & Sheridan, LLP

(57) ABSTRACT

A method for conforming an animated camera to an editorial cut within a software application executing on a computer system. The method includes providing a shot that includes three-dimensional animation captured by a virtual camera associated with a pre-defined camera style; receiving an editorial action that has been performed to the shot; and updating a camera move associated with the virtual camera based on the camera style and the editorial action.

24 Claims, 4 Drawing Sheets

SYSTEM AND METHOD FOR CONFORMING AN ANIMATED CAMERA TO AN EDITORIAL CUT

CROSS-REFERENCE TO RELATED APPLICATIONS

This application claims benefit of U.S. provisional patent application Ser. No. 61/224,749, filed on Jul. 10, 2009, which is hereby incorporated herein by reference.

BACKGROUND

1. Field of the Invention

The present invention relates to the field of computer animation and, in particular, to a system and method for conforming an animated camera to an editorial cut.

2. Description of the Related Art

Prior art techniques for conforming an animated camera to an editorial cut include performing the conforming operation by hand. Using conventional approaches, a layout department would receive an editorial cut list from an editorial department. An example of a cut list may include: "use frames 1 to 10, omit frames 11 to 20, hold frame 21 for five frames, and scale frames 22 through 30 by a factor of 1.3." The goal of the layout department is to take the cut list and revise an existing shot that is as smooth as possible based on the edits made to the existing shot by the editorial department. When performed by hand, this process can be extremely time consuming and error-prone.

As the foregoing illustrates, there is a need in the art for an improved technique that addresses the limitations of current approaches set forth above.

SUMMARY

Embodiments of the invention provide a system and method for conforming an animated camera to an editorial cut. When a discontinuity is found in the edited shot, a software engine searches for knots within a threshold amount of frames at the end of a first retained range and at the beginning of a second retained range. If a knot is found, the knot is retained and the handles are scaled appropriately, thereby preserving the style of the original shot. The style of the shot is associated with the virtual camera that captures the shot, e.g., flat-tangent Bezier spline.

One embodiment of the invention provides a method for conforming an animated camera to an editorial cut within a software application executing on a computer system. The method includes providing a shot that includes three-dimensional animation captured by a virtual camera associated with a pre-defined camera style; receiving an editorial action that has been performed to the shot; and updating a camera move associated with the virtual camera based on the camera style and the editorial action.

One advantage provided by embodiments of the invention is that the animated camera is conformed automatically, which saves a significant amount of time during the animation process, when compared to using prior art "manual" techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide a system and method for conforming an animated camera to an editorial cut. When a discontinuity is found in the edited shot, a software engine searches for knots within a threshold amount of frames at the end of a first retained range and at the beginning of a second retained range. If a knot is found, the knot is retained and the handles are scaled appropriately, thereby preserving the style of the original shot. The style of the shot is associated with the virtual camera that captures the shot, e.g., flat-tangent Bezier spline.

One embodiment of the invention provides a method for conforming an animated camera to an editorial cut within a software application executing on a computer system. The method includes providing a shot that includes three-dimensional animation captured by a virtual camera associated with a pre-defined camera style; receiving an editorial action that has been performed to the shot; and updating a camera move associated with the virtual camera based on the camera style and the editorial action.

Hardware Overview

Figure 1:
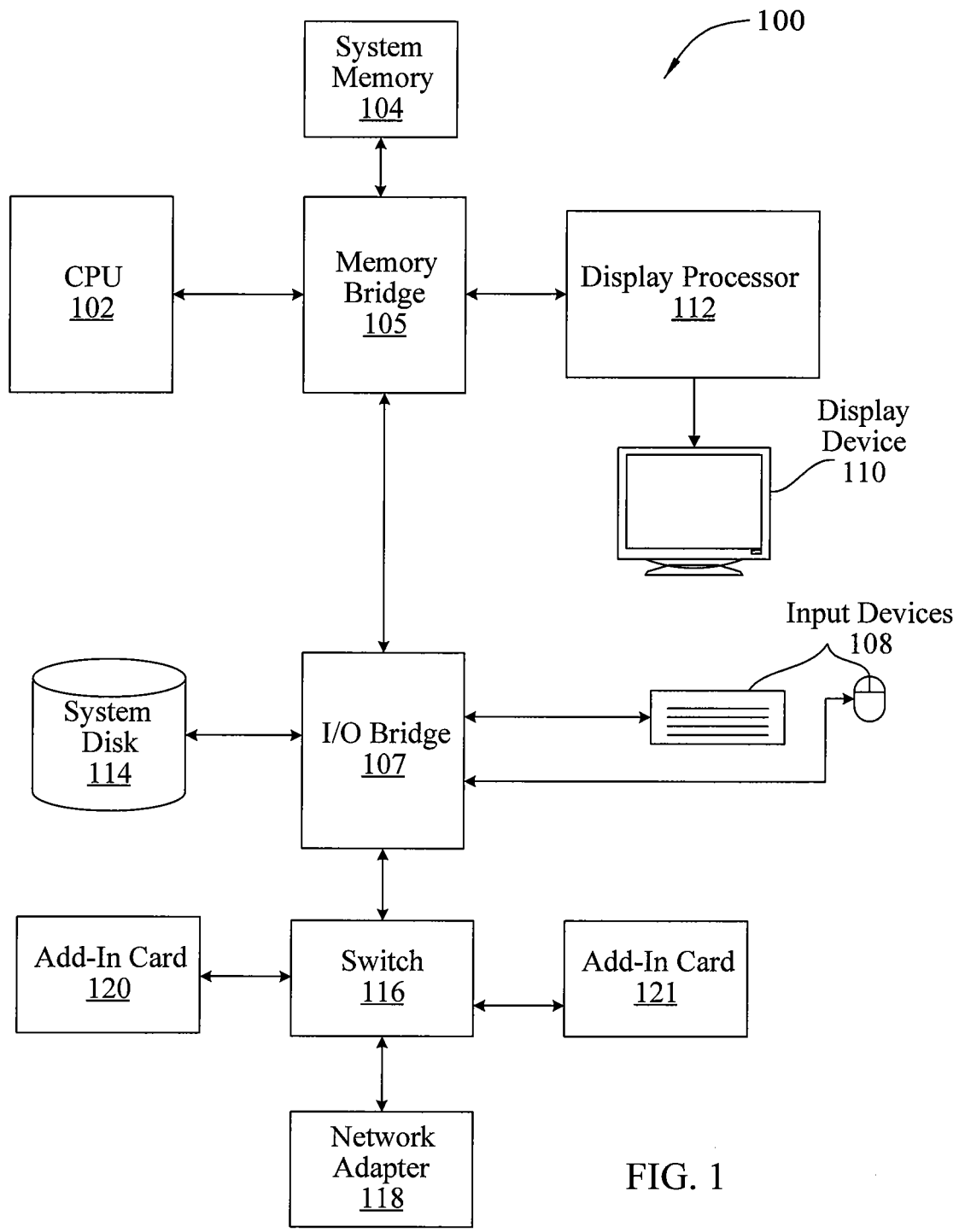
FIG. 1 is a block diagram of a system configured to implement one or more aspects of the invention.

FIG. 1 is a block diagram of a system 100 configured to implement one or more aspects of the present invention. System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The Animation Process

Overview

The process of making an animated film, in some embodiments, includes development (creating a storyline), pre-production (addressing technical challenges), production (making the film), and post-production (polishing the final product).

First, a story idea is pitched. An employee may pitch his or her idea to other members of the development team in a way that is reminiscent of a sales pitch. The real challenge is to get the audience to believe in the idea and see the possibilities of the story. Then, a text treatment is written. A treatment is a short document that summarizes the main idea of the story. Sometimes, many treatments of the same idea will be developed in order to find the right balance between solid ideas and open possibilities, which we will be filled-in later by the development department and storyboard artists.

Then, storyboards are drawn by a story department. Storyboards are similar to a hand-drawn comic book version of the movie and serve as the blueprint for the action and dialogue. Each storyboard artist receives script pages and/or a beat outline. The beat outline is a map of the characters' emotional changes that are seen through actions. Using these guidelines, the artists envision their assigned sequences, talk about, and then pitch their work to the director. When approved, voices are recorded for the characters.

Then editorial begins making reels. A reel is a video tape that allows the cleaned-up storyboard sequence to standalone, without a pitch person to tell the story. A pitch can be successful because the storyteller is strong. The reels seek to validate the sequence and are the first instance where the "timing" of the sequences is understood. Editorial uses the information to fix the length and other elements of each shot in the sequence based on the initial text treatment, storyboards, and their own creative brainstorming and development work.

In the meantime, the art department creates the look and feel of the characters. The art department also designs sets, props, visual looks for services and colors, and color scripts for lighting, which are impressionistic pastel illustrations that emphasize the light in scenes. Next, models are sculpted and articulated. Using the art department's model packet (e.g., a set of informational drawings) the characters, sets, and props are either sculpted by hand and then scanned-in three-dimensionally, or modeled directly in 3D on the computer. The models and/or cameras are then given "avars" (animation variables), or "hinges," which the animator can use to make the object and/or camera move. For example, a character may have over 100 avars in its face alone.

Next, the shots are laid out. Translating the story into 3D scenes, the layout crew choreographs the characters in the set and uses a virtual camera to create shots that capture the motion and story point of each scene. Layout often produces multiple versions of shots to provide the editorial department with choices for cutting the scene for maximum storytelling effect.

The editorial department then edits the shots put together by the layout department. The edited shots are then returned to the layout department. The edited shots are then conformed by the layout department to an editorial cut. In some embodiments, the edited shots may have different timing for the shot as a whole and/or for specific frame ranges within the shots.

Once the scene has been cut and conformed, the final version is released to the animation department. Because the character, models, layout, dialogue, and sound are already set up, animators put all the "pieces" together to animate the film. The animators also choreograph the movements and facial expressions in each scene. They do this by using computer controls and the characters' avars to define key poses. The computer then creates the "in-between" frames using key frame-based techniques.

The sets and characters are then shaded, and lighting is added to the shots. Finally, the shots are rendered and the final touches are added. The final output may be recorded on film or in a form appropriate for digital projection.

As persons having ordinary skill in the art would understand, the animation process described above is simply one example of an animation process, and many other animation processes are within the scope of embodiments of the invention.

As described above, the story department works with drawings. For example, the story department cuts together storyboards creating drawings of shots. At some point, there is an agreement that a particular sequence is ready for production, meaning that story-wise, the shot has been approved. In the meantime, other departments are building the sets, characters, and other objects in the shots.

The layout department then gets all the pieces from the other departments and lays out the shots. The characters may be laid out in the shot in a crude manner, where, for example, for a shot with a character walking across a room, the lay out may include a character with a static pose and then sliding the character with the static pose across the floor. The static character may be later replaced with an animated character by the animation department.

The layout department then shoots the film using one or more virtual cameras. As described, various cameras and camera angles can be used to create multiple versions of the shots included in the film. The layout department then goes back-and-forth with the editorial department to finalize the camera moves for the shots. For example, a shot may not fit within the artistic vision of the editors or director when viewed in 3D. Therefore, the shot would need to be tweaked to make the shot align with a particular artistic vision. For example, the editorial department may need to cut five minutes from the movie, so they work to determine how they can cut one minute from a particular sequence.

At some point, the director approves the layout. The approved layout includes the desired shots, camera moves, and timing. However, the editor has likely changed the timing of the shots and/or camera moves from the original layout created by the layout department. For example, an original shot may include 50 frames. The editor may have changed the shot by speeding up the middle half of the shot and omitting some frames from within the shot so that the approved shot includes just 30 frames.

When the layout department receives the edited shots back from the editorial department, the layout department needs to "conform" the animation sequence back to the editorial cut. Using conventional techniques, manually conforming the animation sequence includes manually copying-and-pasting the avars that control the virtual camera to match the new timing information received from the editorial department. Then, the layout department smoothes-out the re-timed and conformed avars so that the shot in the animation system visually matches the shot in the current editorial reel. Additionally, the shot remains in a style consistent with a style that the downstream departments, such as an animation department, expect to receive. This way, when the animation department receives the conformed shots from the layout department and opens up the files in an animation program, the animation department does not need to do any "extra" work to modify or tweak the shots. The animation department can just open up the files and see the correct timing and the correct camera moves.

Prior art techniques for conforming an animated camera to an editorial cut include performing the conforming operation by hand. Using conventional approaches, the layout department would receive the editorial cut list from the editorial department. An example of a cut list may include: "use frames 1 to 10, omit frames 11 to 20, hold frame 21 for five frames, and scale frames 22 through 30 by a factor of 1.3." The goal of the layout department is to take the cut list and make a new shot that is as smooth as possible. This process can be extremely time consuming and error-prone.

Autotime Engine

Embodiments of the invention provide an autotime engine that is configured to automatically conform an animated camera to an editorial cut. Instead of requiring a layout artist to manually conform the animated camera to the editorial cut, the autotime engine can perform the process automatically. In some embodiments, the autotime engine may provide a preview to the layout artist so that the layout artist can approve the automatically-conformed editorial cut. In some embodiments, the autotime engine attempts to take into account the editor's intent when determining how to simplify the camera to a cleaner curve.

In one embodiment, the autotime engine may comprise a software engine stored in one or more memories and executed by one or more processing units. For example, the autotime engine may be included in an animation application, a rendering application, a modeling application, a computer-aided design (CAD) application, a simulation application, or any other type of software application. In alternative embodiments, the autotime engine may be implemented in fixed-function hardware. In still further embodiments, the autotime engine comprises a combination of hardware and software.

Figure 2:
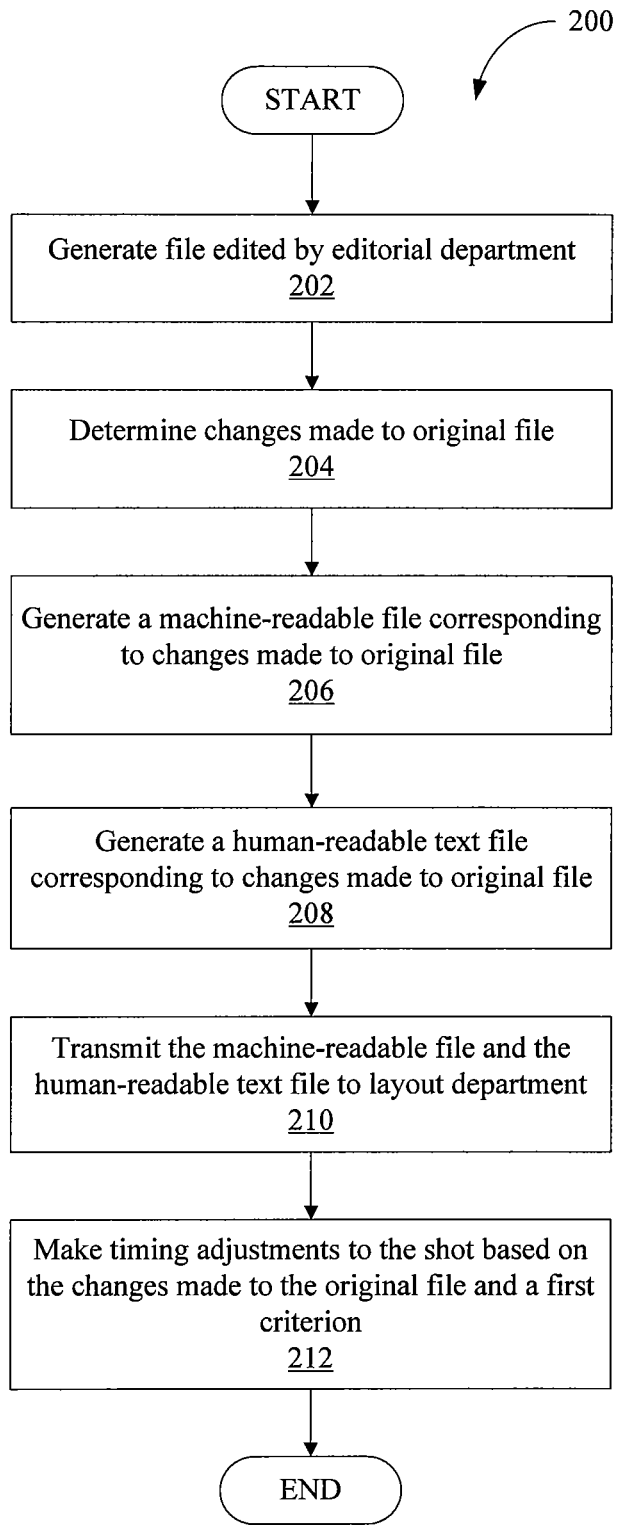
FIG. 2 is a flow diagram of method steps for conforming an animated camera to an editorial cut, according to one embodiment of the invention.

FIG. 2 is a flow diagram of method steps for conforming an animated camera to an editorial cut, according to one embodiment of the invention. Persons skilled in the art will understand that, even though the method 200 is described in conjunction with the systems of FIG. 1, any system configured to perform the method steps, in any order, is within the scope of embodiments of the invention.

As shown, the method 200 begins at step 202, a software application, such as the autotime engine, reads an edited file representing a shot that has been edited by an editorial department. As described above, in one embodiment, the editorial department receives an initial shot from the layout department and then edits the shot.

At step 204, the software application determines what changes were made to the original file by the editorial department. For example, the software tool checks to see which frames were used/retained, which frames were omitted, timing adjustments, how the shot fits together, new first and last frames, and the like.

At step 206, the software application generates a machine-readable file corresponding to the changes made to the original file. At step 208, the software application generates a human-readable text file corresponding to the changes made to the original file. In one embodiment, the human-readable file may provide notes for the layout artist to use when updating the shots. At step 210, the software application causes the machine-readable file and the human-readable text file to be transmitted to the layout department.

The layout department, which also has access to the software application, then receives the files transmitted from the editorial department. At step 212, the software application reads the machine-readable file received from the layout department. For each shot, the software application makes timing adjustments to the edited shot based on the changes made to the original shot and a first criterion. In one embodiment, the first criterion comprises a fixed rule. In some embodiments, the fixed rule may include modifiable parameters. In alternative embodiments, the first criterion may be dynamically generated by the software application based on a set of heuristics. In still further embodiments, the first criterion is based on a combination of one or more fixed rules and one or more heuristics.

In one embodiment, the virtual cameras used to capture the shots are given "avars" (animation variables), or "hinges," which the animator can use to make the camera move. In one embodiment, knots represent the value of a particular avar at a particular frame. For example, a first avar may be "rotation around the x-axis," where a first knot associated with the first avar has a value of "5 degrees." In one embodiment, knots are associated with values for an avar at a specified frame and spline tangent information for the curve, if appropriate, for the spline type. In some embodiments, "cue sheets" are data structures that store knots for various avars. More specifically, for each frame that is retained in the shot, the software application copies the knots for various avars to a new cue sheet. In one embodiment, for each of the avars that affect the camera directly or indirectly, a knot is copied to the new cue sheet. In some embodiments, if a value of an avar is constant from one frame to the next, one of the knots is removed to simplify the cue sheet.

In one embodiment, the shot includes a continuously tracking camera throughout the shot. Knots may be included in a spline that defines the motion of the camera throughout the shot. In one embodiment, the spline is a Bezier curve. In alternative embodiments, the spline is a linear spline or any other type of curve. For example, a knot may be included before the first frame and after the last frame in the shot. In some embodiments, each knot in the spline has a flat tangent to the spline. In other embodiments, the knots may include linear, but non-flat, handles.

Figure 3:
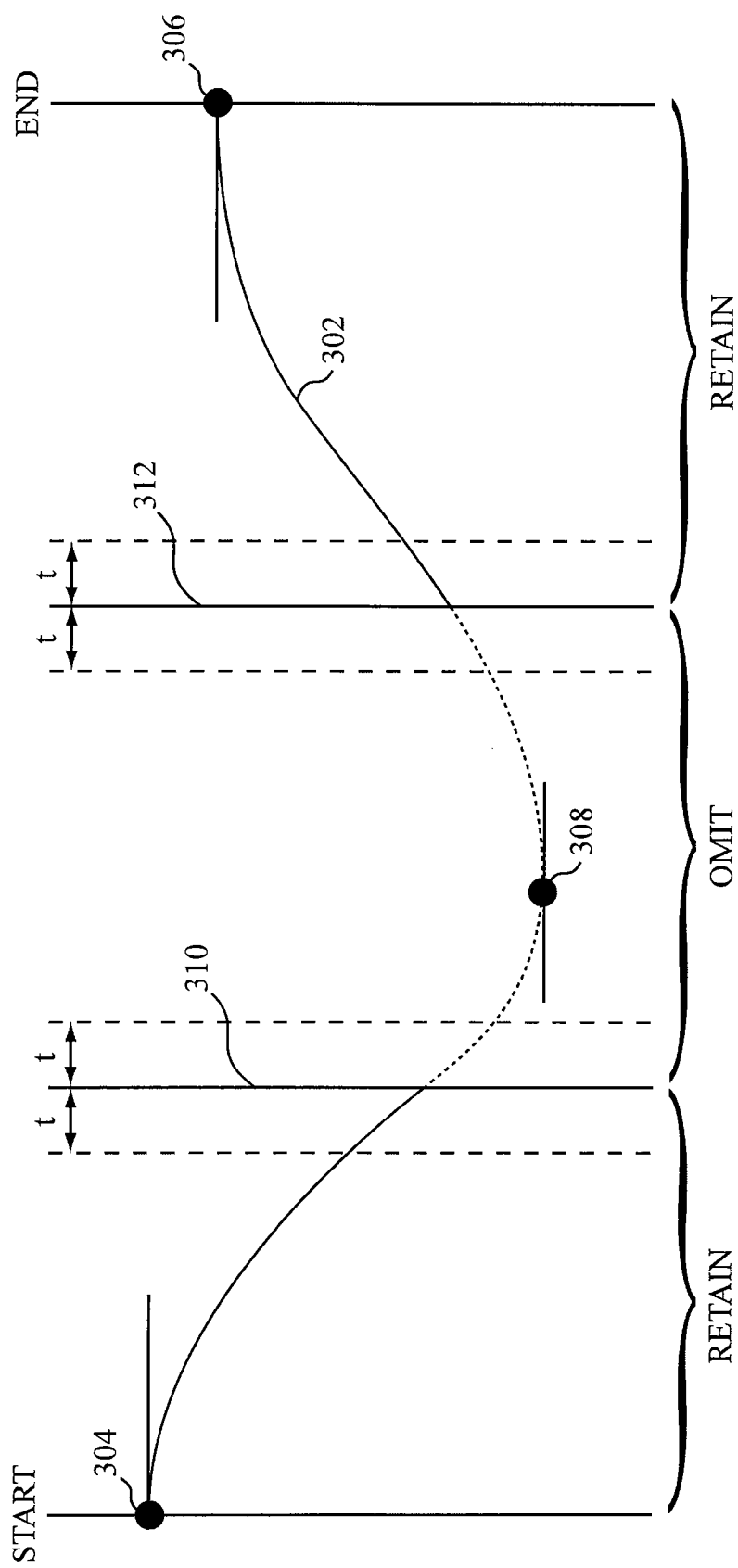
FIG. 3 is conceptual diagram illustrating a camera move spline, according to one embodiment of the invention.

FIG. 3 is conceptual diagram illustrating a camera move spline 302, according to one embodiment of the invention. As shown, the spline 302 includes a knot 304 at the start of the shot and a knot 306 at the end of the shot. Another knot 308 is included within the shot represented by the spline 302.

In the example shown in FIG. 3, the spline 302 is a Bezier spline that includes knots with flat tangents. In other embodiments, the camera move can be represented by any other type of data structure other than a Bezier spline.

Referring back to FIG. 2, at step 212, the autotime engine is configured to make timing adjustments to the spline based on the edits made by the editorial department and a first criterion. In one embodiment, the goal, at step 212, is to preserve the slope between knots. To achieve this goal, the values of the knots are adjusted accordingly. In the case of a continuously tracking camera, where frames have been removed from the shot, the autotime engine may adjust the slope of the curve accordingly. Thus, in this particular case, it is immaterial that frames were omitted from the shot. In some embodiments, the autotime engine may determine whether a timing change is required. If so, the appropriate adjustments are made. For example, by comparing the number of frames in the range from the initial shot (before editing by the editorial department) and the number of frames in the range in the edited shot, the autotime engine can determine if scaling is required. If so, the handles of the knots of the curve are scaled appropriately.

In some embodiments, for the first knot in the shot and the last knot in the shot, the autotime engine preserves the distance between the knot and the nearest frame of the retained range. For example, a knot may be found two frames before the first frame of the shot, and another knot is found two frames after the last frame of the shot. In one embodiment, this "delta" between the knot and the range is preserved on both sides of the shot in the output shot. In one embodiment, preserving the delta maintains the style of the camera move. Additionally, preserving this delta may be used to compute motion blur. For example, some motion blur techniques achieve better results when the camera is moving on the first frame. Additionally, keeping this additional motion in the output shot more closely resembles a real-world camera move where a cameraman would "ease-in" to a panning motion for the shot. In some embodiments, if a knot is found within the threshold in the omitted range, then the knot may be shifted to the nearest frame in the retained range, as described in greater detail below.

In some embodiments, a value discontinuity may be present in the curve defining the camera move. For example, a value discontinuity may be present when one or more frames are omitted in the editorial cut. Handling of the value discontinuity is described below in FIG. 4.

Figure 4:
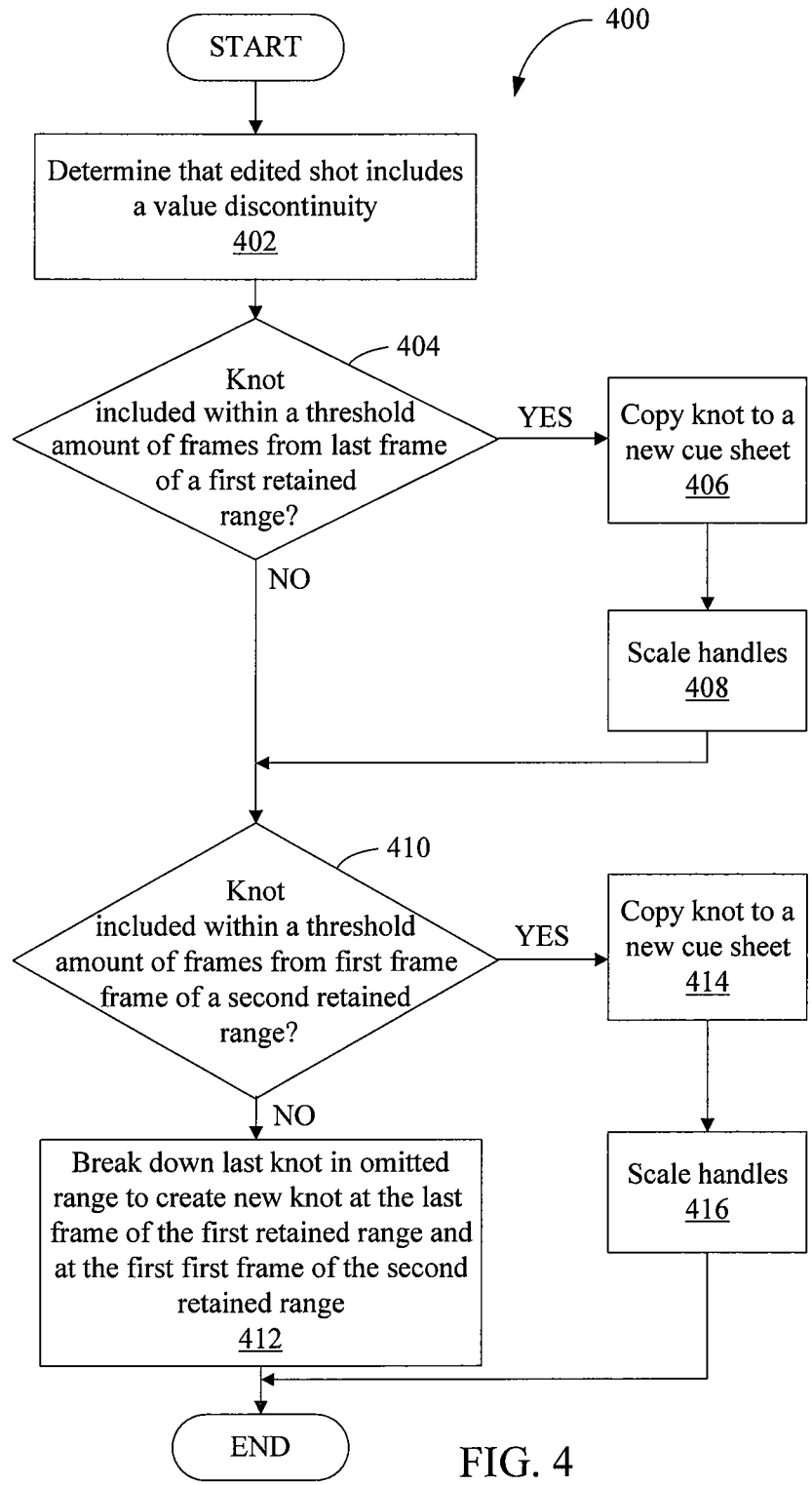
FIG. 4 is a flow diagram of method steps for conforming an animated camera to an editorial cut that includes a value discontinuity, according to one embodiment of the invention.

FIG. 4 is a flow diagram of method steps for conforming an animated camera to an editorial cut that includes a value discontinuity, according to one embodiment of the invention. Persons skilled in the art will understand that, even though the method 400 is described in conjunction with the systems of FIGS. 1 and 3, any system configured to perform the method steps, in any order, is within the scope of embodiments of the invention.

As shown, the method 400 begins at step 402, a software application, such as the autotime engine, determines that an edited shot includes a value discontinuity in the curve. Referring back to the example shown in FIG. 3, the edited shot may retain the frames from knot 304 to frame 310, omit the frames between frame 310 and frame 312, and retain the frames from frame 312 to knot 306. Omitting the frames between frame 310 and frame 312, would, thus, cause a value discontinuity in the spline 302.

At step 404, the software application determines whether a knot is included within a threshold amount of frames from the last frame of a first retained range. In the example shown in FIG. 3, the frames from knot 304 to frame 310 are included in the first retained range, and the frames from frame 312 to knot 306 are included in a second retained range. In one embodiment, the software application only searches inside the retained ranges within a certain threshold (t). For example, the threshold may be approximately 8 to 10 frames. In another example, the threshold may be less than one second worth of frames.

In one embodiment, the software application searches for a knot "backwards" into the retained range from the last frame of the first retained range. In other embodiments, the software application searches "forwards" into the omitted range from the last frame of the first retained range. In further embodiments, the software application searches both backwards and forwards for a knot within the threshold amount from last frame of the first retained range.

If, at step 404, the software application determines that a knot is included within a threshold amount of frames from the last frame of a first retained range, then the method 400 proceeds to step 406. At step 406, in one embodiment, the software application determines that the editor meant to include the knot in the edited shot and copies the found knot to the updated cue sheet. For example, if a knot is included in the omitted range, and within the threshold amount, then the motion of the virtual camera may have been very slight from the knot to the nearest frame of the retained range of the shot. For example, the editor simply may have not realized the exact location of the knot and accidentally not included the knot in the range. At step 408, the software application and scales the handles associated with the knot to smooth out the curve.

If, at step 404, the software application determines that no knot is included within the threshold amount of frames from the last frame of a first retained range, then the method 400 proceeds to step 410.

Steps 410, 414, and 416 are substantially similar to steps 404, 406, and 408, respectively, except applied to the first frame of the second retained range. More specifically, at step 410, the software application determines whether a knot is included within a threshold amount of frames from the first frame of the second retained range. In one embodiment, the software application searches for a knot "forwards" into the retained range from the first frame of the second retained range. In other embodiments, the software application searches "backwards" into the omitted range from the first frame of the second retained range. In further embodiments, the software application searches both backwards and forwards within the threshold amount from first frame of the second retained range.

If, at step 410, the software application determines that a knot is included within a threshold amount of frames from the first frame of the second retained range, then the method 400 proceeds to step 414. At step 414, the software application copies the found knot to the updated cue sheet and, at step 416, scales the handles associated with the knot to smooth out the curve. In some embodiments, scaling the handles preserves a "style" associated with the camera move. For example, the curve may be a Bezier spline and each knot in the curve may have a flat tangent. Scaling the handles, in some examples, may comprise scaling the handles to return the curve to a flat-tangent Bezier spline. Another example of a style that may be preserved by embodiments of the invention is including a knot at the beginning and end of each edited shot.

If, at step 410, the software application determines that no knot is included within the threshold amount of frames from the first frame of the second retained range, then the method 400 proceeds to step 412. At step 412, the software application breaks down the last knot included in the omitted range and creates a new knot at the last frame of the first retained range and at the first frame of the second retained range. In some embodiments, the software application determines that the editor did not intend to include the knot in the retained range. The knot may then be broken down and a smoothing filter may be run on the broken down knot. In one embodiment, breaking down a knot is the process of interpolating the underlying curve, determining the value at a given frame, and inserting a knot at that frame with the appropriate value. However, in some embodiments, inserting a knot is not guaranteed to preserve the shape of the curve. In other embodiments, any other knot other than the last knot in the omitted range, such as the first knot in the omitted range, may be broken down and inserted at the last frame of the first retained range and the first frame of the second retained range.

As shown in example in FIG. 3, no knots are included within the threshold (t) of either the frame 310 or frame 312. Accordingly, the knot 308 is broken down and inserted at both frame 310 and at frame 312 along the spline 302.

In alternative embodiments, the software application includes additional workflow options, such as an option to exclude avars (i.e., do not re-time some avars when, for example, an overall rotation is happening in the shot).

Additionally, the autotime engine can be used for a case where timing changes are performed on something that can drive another part of the camera. For example, a special camera shake rig may be provided. The shake rig is a separate tool that generates values for different variables associated with the camera, e.g., extra-shake, extra-pan, extra-tilts, etc. The shake rig has its own set of values, including amplitude, frequency, among others. Accordingly, different values can be associated with the shake rig for different frames. Then, when the software application executes the shake rig tool, the tool reads those values and generates other values for variables associated with the camera based on the values of the shake rig. The autotime engine can then retime those control points the same way that the camera move is retimed. This is an example of a case where something that is not directly in the camera affects the timing change of the camera.

In sum, embodiments of the invention provide a system and method for conforming an animated camera to an editorial cut. When a discontinuity is found in the edited shot, the autotime engine searches for knots within a threshold amount of frames at the end of a first retained range and at the beginning of a second retained range. If a knot is found, the knot is retained and the handles are scaled appropriately, thereby preserving the style of the original shot.

Advantageously, the updated shot can be easily edited by the animation department. For example, if an animator needs to adjust the camera move, the animator can do so easily since the overall style of the curve is similar to building the shot by hand, and unnecessary knots have been removed from the shot. Another advantage is that the autotime engine provides for conforming the animated camera automatically, which saves a significant amount of time during the animation process, when compared to using prior art "manual" techniques.

In one embodiment, the autotime engine described herein comprises executable instructions (i.e., software) that are executed by a processor in a computer system. In alternative embodiments, the autotime engine is implemented in hardware. In still further embodiments, the autotime engine is implemented in a combination of hardware and software.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for conforming an animated camera to an editorial cut within a software application executing on a computer system, comprising:
   providing a first shot that includes three-dimensional animation captured by a virtual camera, wherein movement of the virtual camera is controlled according to a spline that includes one or more knots, wherein each knot represents a value of a variable associated with the virtual camera at a particular frame;
   receiving an editorial shot that comprises a version of the first shot on which one or more editorial actions have been performed;
   analyzing both the received editorial shot and the first shot to determine an estimation of the one or more editorial actions that were performed to the first shot in order to produce the editorial shot and that necessitate an update to the movement of the virtual camera, based on one or more differences between the editorial shot and the first shot; and
   upon determining the estimation of the one or more editorial actions, automatically updating the movement of the virtual camera by adjusting the value of at least one of the variables based on the determined estimation of the one or more editorial actions.

2. The method of claim 1, wherein the estimation of the one or more editorial actions includes at least one of (i) omission of at least one frame, (ii) retention of at least one frame, (iii) a timing adjustment, (iv) a new first frame and (v) a new last frame.

3. The method of claim 2, wherein each of the one or more knots is associated with a respective handle for modifying the shape of the Bezier curve, and wherein each of the one or more knots has a respective flat tangent relative to the Bezier curve.

4. The method of claim 3, wherein the spline is associated with a first knot included before the movement of the camera is updated, and wherein the spline is associated with a second knot that is included after the movement of the camera is updated.

5. The method of claim 1, further comprising:
   upon determining that the determined estimation of the one or more editorial actions comprises removing one or more frames from the first shot, determining a first retained range of frames, an omitted range of frames, and a second retained range of frames associated with the updated movement of the virtual camera.

6. The method of claim 5, further comprising:
   determining that at least one of the one or more knots is located within the omitted range of frames and within a threshold amount of frames from a last frame of the first retained range of frames.

7. The method of claim 6, wherein updating the movement of the virtual camera further comprises preserving the at least one knot within the omitted range of frames.

8. The method of claim 6, wherein the threshold amount of frames comprises fewer than a number of frames included in one second of time.

9. The method of claim 5, wherein updating the movement of the virtual camera further comprises:
   determining that a first one knot is located within the omitted range of frames and within a threshold amount of frames from a first frame of the second retained range of frames, wherein the threshold amount of frames comprises fewer than a number of frames included in one second of time.

10. The method of claim 9, wherein updating the movement of the virtual camera further comprises:
    upon determining that the first knot is located within the omitted range of frames and within the threshold amount of frames from the first frame of the second retained range of frames:
        preserving the first knot within the omitted range of frames; and
        scaling one or more handles associated with the first knot in order to preserve a movement style of the virtual camera.

11. The method of claim 1, further comprising:
    generating a machine-readable file specifying the determined estimation of the one or more editorial actions that have been performed to the first shot,
    and wherein updating the movement of the virtual camera further comprises executing the generated machine-readable file to make timing adjustments to the movement of the virtual camera based on the determined estimation of the one or more editorial actions.

12. A non-transitory computer-readable medium storing instructions that, when executed by a processor, cause a computer system to conform an animated camera to an editorial cut, by performing an operation comprising:
    providing a first shot that includes three-dimensional animation captured by a virtual camera, wherein movement of the virtual camera is controlled according to a spline that includes one or more knots, wherein each knot represents a value of a variable associated with the virtual camera at a particular frame;

receiving an editorial shot that comprises a version of the first shot on which one or more editorial actions have been performed;

analyzing both the received editorial shot and the first shot to determine an estimation of the one or more editorial actions that were performed to the first shot in order to produce the editorial shot and that necessitate an update to the movement of the virtual camera, based on one or more differences between the editorial shot and the first shot; and upon determining the estimation of the one or more editorial actions, automatically updating the movement of the virtual camera, by adjusting the value of at least one of the variables based on the determined estimation of the one or more editorial actions.

13. The non-transitory computer-readable medium of claim 12, wherein the spline is a Bezier curve.

14. The non-transitory computer-readable medium of claim 13, wherein each of the one or more knots is associated with a respective handle for modifying the shape of the Bezier curve, and wherein each of the one or more knots has a respective flat tangent relative to the Bezier curve.

15. The non-transitory computer-readable medium of claim 14, wherein the spline is associated with a first knot included before the movement of the camera is updated, and wherein the spline is associated with a second knot that is included after the movement of the camera is updated.

16. The non-transitory computer-readable medium of claim 12, the operation further comprising:

upon determining that the determined estimation of the one or more editorial actions comprises removing one or more frames from the first shot, determining a first retained range of frames, an omitted range of frames, and a second retained range of frames associated with the updated movement of the virtual camera.

17. The non-transitory computer-readable medium of claim 16, further comprising:

determining that at least one of the one or more knots is located within the omitted range of frames and within a threshold amount of frames from a last frame of the first retained range of frames.

18. The non-transitory computer-readable medium of claim 17, wherein updating the movement of the virtual camera further comprises preserving the at least one knot within the omitted range of frames.

19. The non-transitory computer-readable medium of claim 17, wherein the threshold amount of frames comprises fewer than a number of frames included in one second of time.

20. The non-transitory computer-readable medium of claim 16, wherein updating the movement of the virtual camera further comprises:

determining that a first knot is located within the omitted range of frames and within a threshold amount of frames from a first frame of the second retained range of frames, wherein the threshold amount of frames comprises fewer than a number of frames included in one second of time.

21. The non-transitory computer-readable medium of claim 20, wherein updating the movement of the virtual camera further comprises:

upon determining that the first knot is located within the omitted range of frames and within the threshold amount of frames from the first frame of the second retained range of frames:

preserving the first knot within the omitted range of frames; and scaling one or more handles associated with the first knot in order to preserve a movement style of the virtual camera.

22. The non-transitory computer-readable medium of claim 12, further comprising:

generating a machine-readable file specifying the determined estimation of the one or more editorial actions that have been performed to the first shot, and wherein updating the movement of the virtual camera further comprises executing the generated machine-readable file to make timing adjustments to the movement of the virtual camera based on the determined estimation of the one or more editorial actions.

23. A system for conforming an animated camera to an editorial cut, the system comprising:

a processor configured to:

provide a first shot that includes three-dimensional animation captured by a virtual camera, wherein movement of the virtual camera is controlled according to a spline that includes one or more knots, wherein each knot represents a value of a variable associated with the virtual camera at a particular frame;

receive an editorial shot that comprises a version of the first shot on which one or more editorial actions have been performed;

analyze both the received editorial shot and the first shot to determine an estimation of the one or more editorial actions that were performed to the first shot in order to produce the editorial shot and that necessitate an update to the movement of the virtual camera, based on one or more differences between the editorial shot and the first shot; and upon determining the estimation of the one or more editorial actions, automatically update the movement of the virtual camera, by adjusting the value of at least one of the variables based on the estimation of the determined one or more editorial actions.

24. The system of claim 23, further comprising a memory storing instructions that, when executed by the processor, configure the processor to:

provide the first shot that includes the three-dimensional animation;

receive the editorial shot;

determine the estimation of the one or more editorial actions; and update the movement of the virtual camera.

* * * * *